United States Patent
Aliakseyeu et al.

(10) Patent No.: US 12,245,344 B2
(45) Date of Patent: Mar. 4, 2025

(54) INDICATING A LIKELIHOOD OF PRESENCE BEING DETECTED VIA MULTIPLE INDICATIONS

(71) Applicant: SIGNIFY HOLDING B.V., Eindhoven (NL)

(72) Inventors: Dzmitry Viktorovich Aliakseyeu, Eindhoven (NL); Berent Willem Meerbeek, Eindhoven (NL); Hugo Jose Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 284 days.

(21) Appl. No.: 17/772,275

(22) PCT Filed: Oct. 27, 2020

(86) PCT No.: PCT/EP2020/080109
§ 371 (c)(1),
(2) Date: Apr. 27, 2022

(87) PCT Pub. No.: WO2021/083855
PCT Pub. Date: May 6, 2021

(65) Prior Publication Data
US 2022/0386436 A1 Dec. 1, 2022

(30) Foreign Application Priority Data
Nov. 1, 2019 (EP) .................................. 19206738

(51) Int. Cl.
*H05B 47/115* (2020.01)
*G06F 1/3231* (2019.01)
(Continued)

(52) U.S. Cl.
CPC ......... *H05B 47/115* (2020.01); *G06F 1/3231* (2013.01); *H05B 47/11* (2020.01); *H05B 47/19* (2020.01)

(58) Field of Classification Search
CPC ...... H05B 47/115; H05B 47/11; H05B 47/19; G06F 1/3231; G08C 17/02; Y02B 20/40
See application file for complete search history.

(56) References Cited

U.S. PATENT DOCUMENTS 8,829,821 B2 * 9/2014 Chobot .................. H05B 45/00
315/149
9,002,522 B2 * 4/2015 Mohan ................. H05B 47/175
700/275

(Continued)

FOREIGN PATENT DOCUMENTS

EP 3076764 A1 10/2016
EP 3127402 A1 2/2017
(Continued)

*Primary Examiner* — Adnan Aziz

(57) ABSTRACT

A method comprises determining (101) sensing input and determining (103) a likelihood that a human or animal is present based on the sensing input. The sensing input reflects changes in radio frequency signals received by one or more devices. The method further comprises controlling (105) a lighting device to render a light effect upon determining that the likelihood exceeds a presence detection threshold, and to continue to render the light effect for a subsequent predetermined period of time even when the likelihood changes by more than a predetermined value within the predetermined period. The method further comprises indicating (107) the likelihood to a user via an indication selected from a plurality of indications, e.g. by rendering the indication on the lighting device. A different indication of the plurality of indications is selected upon determining that the likelihood has changed more than the predetermined value.

14 Claims, 7 Drawing Sheets

(51) Int. Cl.
  *H05B 47/11*     (2020.01)
  *H05B 47/19*     (2020.01)

(56) References Cited

U.S. PATENT DOCUMENTS

| | | | | |
|---|---|---|---|---|
| 9,167,423 | B2* | 10/2015 | Schnaare | H04W 12/0471 |
| 9,678,559 | B1 | 6/2017 | Devries et al. | |
| 2005/0128751 | A1* | 6/2005 | Roberge | G06F 3/1446 |
| | | | | 362/276 |
| 2009/0278479 | A1* | 11/2009 | Platner | H05B 47/155 |
| | | | | 340/309.9 |
| 2010/0185969 | A1* | 7/2010 | Wendt | H05B 47/175 |
| | | | | 715/771 |
| 2010/0301769 | A1* | 12/2010 | Chemel | H05B 47/199 |
| | | | | 315/294 |
| 2012/0068608 | A1* | 3/2012 | Covaro | H05B 47/185 |
| | | | | 250/201.1 |
| 2017/0132909 | A1* | 5/2017 | Rabb | G08B 29/18 |
| 2017/0150578 | A1 | 5/2017 | Dureiko et al. | |
| 2018/0235039 | A1* | 8/2018 | Krajnc | H05B 45/20 |
| 2018/0365975 | A1 | 12/2018 | Xu et al. | |
| 2019/0087696 | A1 | 3/2019 | Verhoeven et al. | |

FOREIGN PATENT DOCUMENTS

| | | | |
|---|---|---|---|
| JP | 2016510492 | A | 4/2016 |
| JP | 2017158009 | A | 9/2017 |
| WO | 2017108374 | A1 | 6/2017 |
| WO | 2018024522 | A1 | 2/2018 |

\* cited by examiner

INDICATING A LIKELIHOOD OF PRESENCE BEING DETECTED VIA MULTIPLE INDICATIONS

CROSS-REFERENCE TO PRIOR APPLICATIONS

This application is the U.S. National Phase application under 35 U.S.C. § 371 of International Application No. PCT/EP2020/080109, filed on Oct. 27, 2020, which claims the benefit of European Patent Application No. 19206738.7, filed on Nov. 1, 2019. These applications are hereby incorporated by reference herein.

FIELD OF THE INVENTION

The invention relates to a system for determining a likelihood that a human or animal is present based on sensing input, said sensing input reflecting changes in radio frequency signals received by one or more devices.

The invention further relates to a method of determining a likelihood that a human or animal is present based on sensing input, said sensing input reflecting changes in radio frequency signals received by one or more devices.

The invention also relates to a computer program product enabling a computer system to perform such a method.

BACKGROUND OF THE INVENTION

In smart homes and smart offices, presence detection is becoming increasingly important, e.g. to automatically switch on and off lights and automatically control heating/air-conditioning. Often, PIR sensors or cameras are used to implement presence detection. These are relatively easy to setup and commission. For example, US 2010/00185969 A1 discloses a light control system with a user interface for interactively changing settings in a lighting system, particularly a user interface enabling easy and comfortable interactive changes of light scenes created by a lighting system. In an embodiment, a scene to be illuminated is graphically represented and some of the locations are recolored based on movement sensor information.

In the last few years, network-based presence sensing technologies have matured and appeared on the market. Notable example is Ivani's "network presence sensing" technology. Applications of this technology range from detecting motion based on a change in the environment to people counting and locating. The main idea behind the technology is measuring the behavior of wireless communications (e.g. between IoT devices). The location and number of people, body weight, movement direction and other parameters will influence this behavior, such that based on the detected changes (e.g. variations in signal strength or Channel State Information (CSI)) a person or a group of people can be detected. The precision and versatility of the system depends on the number of communicating devices and usually gets better when more devices are present (the minimum number of devices is two such that signals can be generated and received to evaluate their behavior).

To setup and commission network presence sensing, the user (with support from the system) will normally need to define detection areas, assign lights and light scenes, and find optimal settings for each area's detection sensitivity, amongst others. Setting the sensitivity or understanding why the system might behave in a certain way might be challenging for the user, since, unlike the traditional presence sensing devices (e.g. PIR, camera), the system does not have a well-defined field of view in which detections take place and can be triggered through objects (e.g. a wall or a door). This could lead to confusion and impact users' acceptability of the system. Additionally, the detection performance of RF sensing might change over time due to e.g. furniture being displaced or doors being closed/open.

US 2017/150578 discloses a method for lighting control using active wireless active feedback monitoring of behavioral activity of moving objects. Presence of moving objects (such as humans, pets/animals, cars and the like) within the range of an established wireless network tends to modulate the wireless signal strength between wireless nodes. Using the monitored variation in the standard deviation of the wireless signal strength between network nodes, behavioral activity of moving objects may be used to directly control ambient lighting conditions within an area of interest.

SUMMARY OF THE INVENTION

It is a first object of the invention to provide a system, which helps a user setup and commission a network presence sensing system.

It is a second object of the invention to provide a method, which helps a user setup and commission a network presence sensing system.

In a first aspect of the invention, a system for determining a likelihood that a human or animal is present based on sensing input, said sensing input reflecting changes in radio frequency signals received by one or more devices, comprises at least one input interface, at least one output interface, and at least one processor configured to use said at least one input interface to determine said sensing input, determine said likelihood that said human or animal is present based on said sensing input, use said at least on output interface to control a lighting device to render a light effect upon determining that said likelihood exceeds a presence detection threshold, and to continue to render said light effect for a subsequent predetermined period of time even when said likelihood changes by more than a predetermined value within said predetermined period, and use said at least one output interface to indicate said likelihood to a user via an indication selected from a plurality of indications, a different indication of said plurality of indications being selected upon determining that said likelihood has changed more than said predetermined value.

By allowing the user to walk around a room or building and see how well the presence sensing covers his current position (including whether it is covered or not), he is able to easily determine whether the network presence sensing has been setup and commissioned adequately. A lighting device's light source that is turned on when presence is detected (i.e. the likelihood starts to exceed the presence detection threshold) will not immediately be turned off when the likelihood drops below the presence detection threshold, to avoid flickering lights amongst others, so not even if the likelihood changes more than a predetermined value. This is not suitable for checking the presence sensing coverage. For checking the presence sensing coverage, a different indication is provided as soon as the likelihood has changed more than a predetermined value, e.g. as soon as a likelihood/confidence level is determined that corresponds to a different indication. Said lighting device may be one of said one or more devices.

Said at least one processor may be configured to use said at least one output interface to indicate said likelihood to said user by displaying said indication on a display, e.g. of a mobile device, TV or projector. This allows more information to be provided than if only the lighting devices themselves would be used to provide the indication.

Said at least one processor may be configured to use said at least one output interface to control, in a normal operations mode of said lighting device, said lighting device to render said light effect upon determining that said likelihood exceeds said presence detection threshold and use said at least one output interface to provide, in a configuration mode of said lighting device, said indication on said lighting device by rendering a further light effect of a plurality of light effects, a different light effect of said plurality of light effects being selected upon determining that said likelihood has changed more than said predetermined value.

While being less informative than indicating the likelihood on a display, this use of the lighting device to indicate the likelihood may be simplest to use and implement, as it does not require an additional device (e.g. a mobile device), and the feedback is provided directly in the environment. The configuration mode may be activated for all lighting devices in a home or office or only for subset of these lighting devices. In the former case, the system may itself be switched between normal operations mode and configuration mode and thereby cause all associated lighting devices to be switched to the same mode. Said at least one processor may be configured to use said at least one input interface to receive user input and switch between said normal operations mode and said configuration mode based on said user input.

Said at least one processor may be configured to determine a chromaticity for said further light effect based on said likelihood such that said chromaticity indicates said likelihood, determine a brightness and/or light output level for said further light effect based on said likelihood such that said brightness and/or light output level indicates said likelihood, and/or determine a level of dynamicity for said further light effect based on said likelihood such that said level of dynamicity indicates said likelihood. Said level of dynamicity may be a flashing speed, for example.

Said at least one processor may be configured to determine said further light effect based on said likelihood and said lighting device's capabilities. For example, a chromaticity may be determined for said further light effect based on said likelihood if said light device has color capabilities and a light output level may be determined for said further light effect based on said likelihood if said light device does not have color capabilities.

Said at least one processor may be configured to select a first light effect from said plurality of light effects upon determining that said likelihood exceeds said presence detection threshold and a second light effect from said plurality of light effects upon determining that said likelihood is below said presence detection threshold. This makes it easier for a user to see whether he is being detected adequately at his current position. By rendering a light effect even when the user is not being detected, the user is given better feedback. If no light effect is rendered when the user is not being detected, then the user might not know for certain that there is no other cause for a lighting device not rendering any light effect, e.g. a power switch being turned off.

Said at least one processor may be configured to determine a color for said further light effect in a first color spectrum upon determining that said likelihood exceeds said presence detection threshold and a color for said further light effect in a second color spectrum upon determining that said likelihood is below said presence detection threshold. Said at least one processor may be configured to determine said color within said first color spectrum or said second color spectrum based on said first likelihood such that said color further indicates said likelihood. For example, a light effect with a color in the green spectrum may be rendered if the likelihood exceeds the presence detection threshold and a light effect with a color in the red spectrum or orange-red spectrum may be rendered if the likelihood stays below the presence detection threshold.

Said at least one processor is configured to determine a plurality of likelihoods that a human or animal is present based on a plurality of sensing inputs, each of said plurality of sensing inputs corresponding to a respective spatial location of said human or animal, and associate each of said plurality of likelihoods with said respective spatial locations in a memory. This makes it possible to identify and indicate the areas where human or animal presence cannot be detected well. For example, said at least one processor may be configured to use said at least one output interface to display a spatial map indicating said plurality of likelihoods at said respective spatial locations. The sensing inputs do not need to each be based on information generated by all sensing nodes and different sensing inputs may be based on information generated by different sets of sensing nodes.

In a second aspect of the invention, a method of determining a likelihood that a human or animal is present based on sensing input, said sensing input reflecting changes in radio frequency signals received by one or more devices, comprises determining said sensing input, determining said likelihood that said human or animal is present based on said sensing input, controlling a lighting device to render a light effect upon determining that said likelihood exceeds a presence detection threshold, and to continue to render said light effect for a subsequent predetermined period of time even when said likelihood changes by more than a predetermined value within said predetermined period, and indicating said likelihood to a user via an indication selected from a plurality of indications, a different indication of said plurality of indications being selected upon determining that said likelihood has changed more than said predetermined value. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for determining a likelihood that a human or animal is present based on sensing input, said sensing input reflecting changes in radio frequency signals received by one or more devices.

The executable operations comprise determining said sensing input, determining said likelihood that said human or animal is present based on said sensing input, controlling a lighting device to render a light effect upon determining that said likelihood exceeds a presence detection threshold, and to continue to render said light effect for a subsequent predetermined period of time even when said likelihood changes by more than a predetermined value within said predetermined period, and indicating said likelihood to a user via an indication selected from a plurality of indications, a different indication of said plurality of indications being selected upon determining that said likelihood has changed more than said predetermined value.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
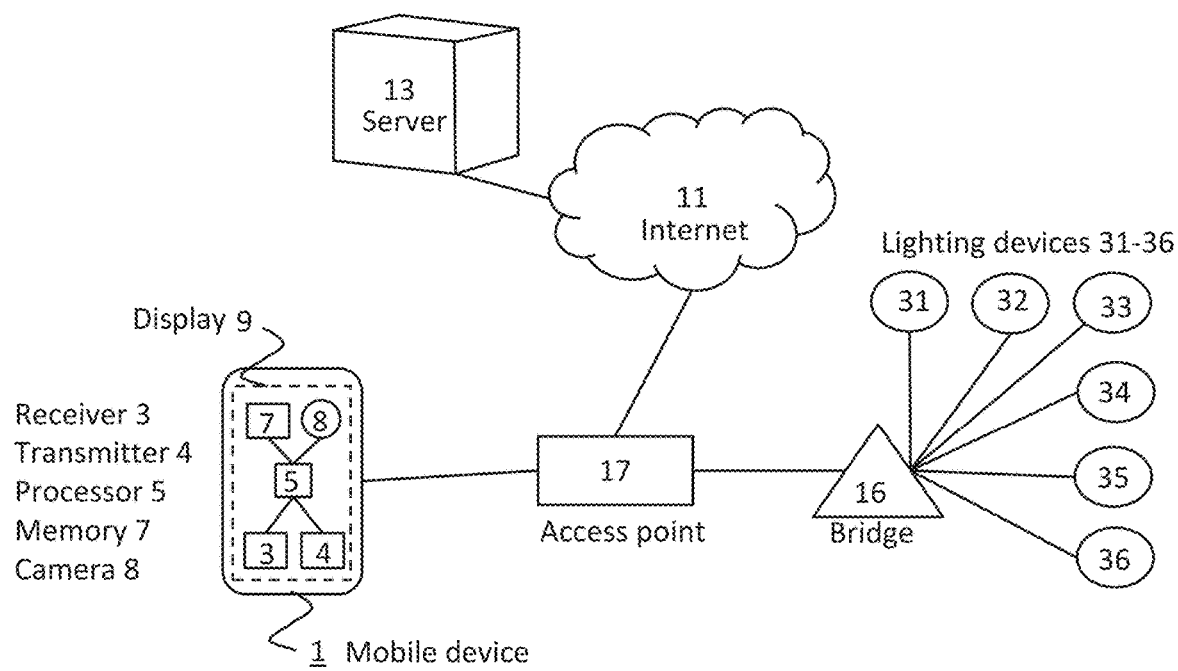
FIG. 1 is a block diagram of a first embodiment of the system.

FIG. 1 shows a first embodiment of the system for determining a likelihood that a human or animal is present based on sensing input. The sensing input reflects changes in radio frequency (RF) signals received by one or more devices. The sensing input may reflect changes in signal strength and/or Channel State Information (CSI) of the received RF signals, for example. Alternatively or additionally, the sensing input may reflect changes in Time of Arrival and/or phase shifts and/or differences in reception when having multiple transmit or receive antennas, for example.

In the example of FIG. 1, the presence sensing system comprises lighting devices 31-36 and a bridge 16. At least one these devices transmit RF signals and the other devices receive RF signals. The lighting devices 31-36 may be Hue lamps and the bridge 16 may be a Hue bridge, for example. In an alternative example, the bridge 16 is not part of the presence sensing system.

In this first embodiment, the system is a mobile device 1. Mobile device 1 may run an app that allows a user to control lighting devices 31-36, for example. The lighting devices 31-36 communicate with the bridge 16, e.g. using Zigbee technology. The mobile device 1 is able to control the lighting devices 31-36 via a wireless LAN access point 17 and the bridge 16. The wireless LAN access point 17 is connected to the Internet 11. An Internet server 13 is also connected to the Internet 11. The Internet server 13 may also be able to control the lighting devices 31-36, e.g. based on input from a voice assistant like Amazon's Alexa.

The mobile device 1 comprises a receiver 3, a transmitter 4, a processor 5, memory 7, a camera 8, and a display 9. The processor 5 is configured to use the receiver 3 to determine the sensing input by combining data received from the devices that receive the RF signals, determine the likelihood that the human or animal is present based on the sensing input, and use the transmitter 4 to control one or more the lighting devices 31-36 to render a light effect upon determining that the likelihood exceeds a presence detection threshold, and to continue to render the light effect for a subsequent predetermined period of time even when the likelihood changes by more than a predetermined value within the predetermined period.

The processor 5 is further configured to indicate the likelihood to a user via an indication selected from a plurality of indications. A different indication of the plurality of indications is selected upon determining that the likelihood has changed more than the predetermined value. In the embodiment of FIG. 1, the processor 5 is configured to indicate the likelihood to the user by displaying the indication on the display 9.

Thus, the state of the presence detection system is visualized for the user by indicating how likely the user is detected in a specific area. The visualization may be realized via one or more lighting devices or via a floorplan view, for example. The level of details provided normally depends on the specific visualization method used. In the embodiment of FIG. 1, the display 9 of the mobile device 1 is used to provide the visualization. As the user moves around, the likelihood/confidence level of him or her being detected is displayed. In addition, an identification or a name of the detection area may be shown. In the case of multiple detection areas having some chance to detect the user in his or her current position both confidence levels and names of detection areas could be displayed.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen, for example. The processor 5 may use this touch screen to provide a user interface, for example. The memory 7 may comprise one or more memory units. The memory 7 may comprise solid state memory, for example. The camera 8 may comprise a CMOS or CCD sensor, for example. The camera 8 may be used to provide an augmented reality view, for example.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the lighting devices 31-36 are controlled by the mobile device 1 via the bridge 16. In an alternative embodiment, one or more of the lighting devices 31-36 are controlled by the mobile device 1 without a bridge, e.g. directly via Bluetooth or WiFi.

Figure 2:
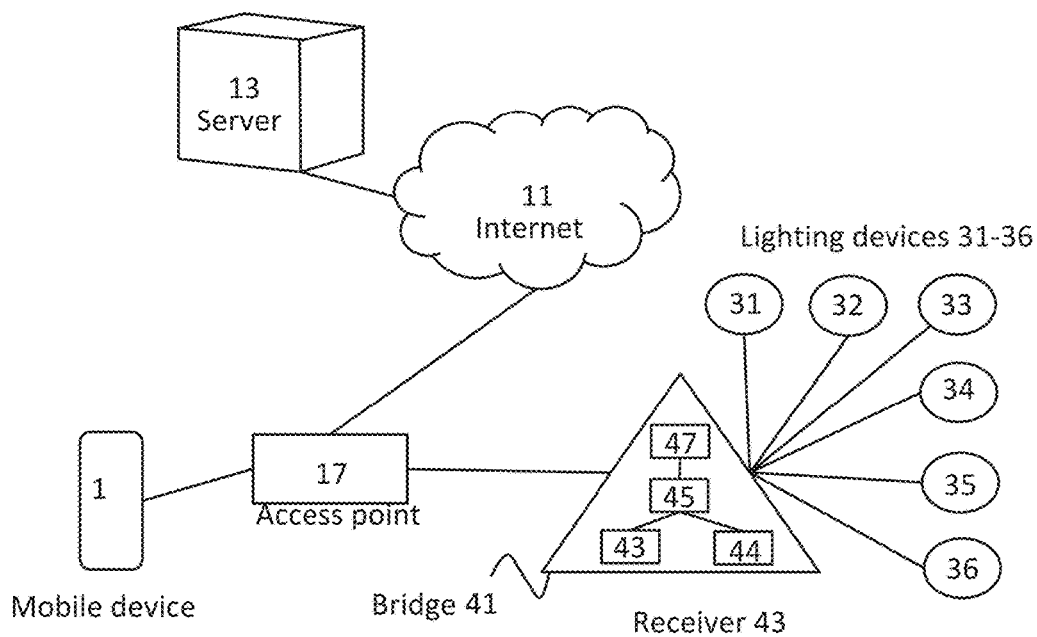
FIG. 2 is a block diagram of a second embodiment of the system.

FIG. 2 shows a second embodiment of the system for determining a likelihood that a human or animal is present based on sensing input. In this second embodiment, the system is a bridge 41. A mobile device 35 is able to control the lighting devices 31-36 via the wireless LAN access point 17 and the bridge 16.

The bridge 41 comprises a receiver 43, a transmitter 44, a processor 45, and a memory 47. The processor 45 is configured to use the receiver 43 to determine the sensing input and determine the likelihood that the human or animal is present based on the sensing input. The processor 44 is further configured to use the transmitter 44 to control, in a normal operations mode of the lighting devices 31-36, one or more of the lighting devices 31-36 to render a light effect upon determining that the likelihood exceeds a presence detection threshold, and to continue to render the light effect for a subsequent predetermined period of time even when the likelihood changes by more than a predetermined value within the predetermined period.

The processor 45 is further configured to use the transmitter 44 to provide, in a configuration mode of the lighting devices 31-36, an indication of the likelihood by controlling one or more of the lighting devices 31-36 to render a further light effect of a plurality of light effects. A different light effect of the plurality of light effects is selected upon determining that the likelihood has changed more than the predetermined value.

As previously mentioned, the level of details provided normally depends on the specific visualization method used. In the embodiment of FIG. 2, one or more of the lighting devices 31-36 are used to provide the visualization. Depending on the user's preferences and lighting device capabilities, different mappings of the system state to the lighting devices could be employed.

One or more of the following light settings may be used to indicate the likelihood:
  color chromaticity;
  color brightness/lightness;
  light output level/dim level;
  level of dynamicity (e.g. frequency, pattern).

For example, if a user has only white bulbs, light on full brightness could indicate a high confidence level of a person being detected (e.g. >90%), while lights off could indicate a low confidence level (e.g. <30%), and everything in between could be indicated by lights being on with half brightness.

If the user has color bulbs, then color could be used to display the confidence level (e.g. as a gradient between green indicating close to 100% to red indicating close to 0%). Different color spectra may be used for likelihoods below a presence detection threshold than for likelihoods above the presence detection threshold. Thus, a color is determined for the further light effect in a first color spectrum upon determining that the likelihood exceeds the presence detection threshold and in a second color spectrum upon determining that the likelihood is below the presence detection threshold. The color is determined within the first color spectrum or the second color spectrum based on the first likelihood such that the color further indicates the likelihood.

For example, a color in the green spectrum is determined if a human or animal is detected to be present and a color in the orange-red spectrum is determined if no human or animal is detected to be present. The orange spectrum may be used if the likelihood is below the presence detection threshold, but relatively close to the threshold. The red spectrum may be used if the likelihood is below the presence detection threshold and relatively far away from the threshold.

In the embodiment of the bridge 41 shown in FIG. 2, the bridge 41 comprises one processor 45. In an alternative embodiment, the bridge 41 comprises multiple processors. The processor 45 of the bridge 41 may be a general-purpose processor, e.g. ARM-based, or an application-specific processor. The processor 45 of the bridge 41 may run a Unix-based operating system for example. The memory 47 may comprise one or more memory units. The memory 47 may comprise solid-state memory, for example. The memory 47 may be used to store a table of connected lights, for example.

The receiver 43 and the transmitter 44 may use one or more wired or wireless communication technologies, e.g. Ethernet for communicating with the wireless LAN access point 17 and Zigbee for communicating with the lighting devices 31-36, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 43 and the transmitter 44 are combined into a transceiver. The bridge 41 may comprise other components typical for a network device such as a power connector. The invention may be implemented using a computer program running on one or more processors.

In the embodiments of FIGS. 1 and 2, the system of the invention comprises a mobile device or a bridge. In an alternative embodiment, the system of the invention is a different device, e.g. a personal or server computer or a lighting device. In the embodiments of FIGS. 1 and 2, the system of the invention comprises a single device. In an alternative embodiment, the system of the invention comprises a plurality of devices.

Figure 3:
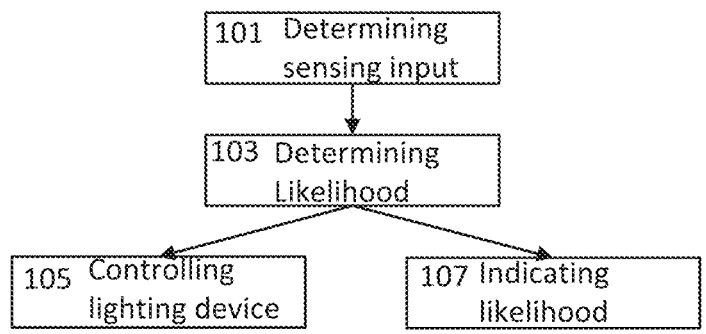
FIG. 3 is a flow diagram of a first embodiment of the method.

A first embodiment of determining a likelihood that a human or animal is present based on sensing input is shown in FIG. 3. The sensing input reflects changes in, e.g. signal strength or Channel State Information (CSI), of radio frequency signals received by one or more devices. A step 101 comprises determining the sensing input. A step 103 comprises determining the likelihood that the human or animal is present based on the sensing input. A step 105 comprises controlling a lighting device to render a light effect upon determining that the likelihood exceeds a presence detection threshold, and to continue to render the light effect for a subsequent predetermined period of time even when the likelihood changes by more than a predetermined value within the predetermined period.

Figures 4, 5:
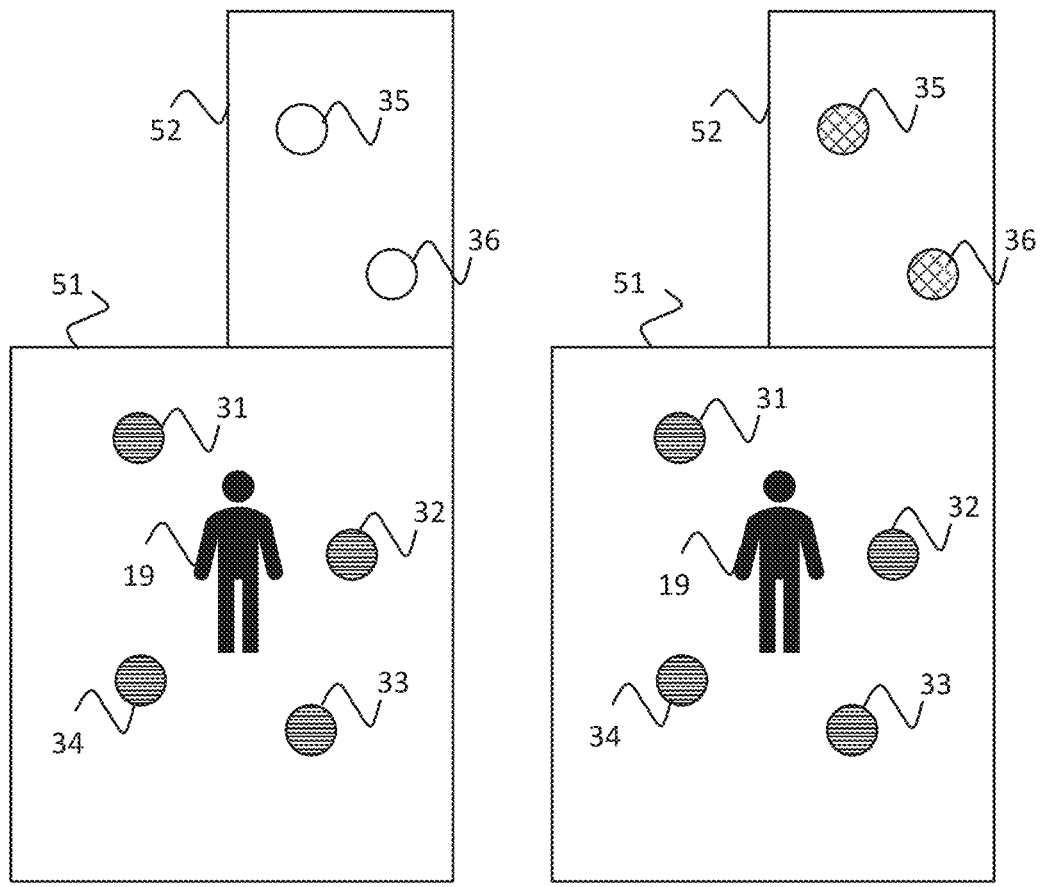
FIG. 4 shows a presence likelihood being indicated in lighting devices of one room.
FIG. 5 shows a presence likelihood being indicated in lighting devices of two rooms.

A step 107 comprises indicating the likelihood to a user via an indication selected from a plurality of indications. A different indication of the plurality of indications is selected upon determining that the likelihood has changed more than the predetermined value. The likelihood may be indicated on the lighting device, e.g. in a configuration mode of the presence detection system, or on a different device, e.g. a mobile device. The likelihood may be indicated on multiple lighting devices, e.g. multiple lighting devices in one room, as shown in FIG. 4, or multiple lighting devices in multiple rooms, as shown in FIG. 5.

Figure 6:
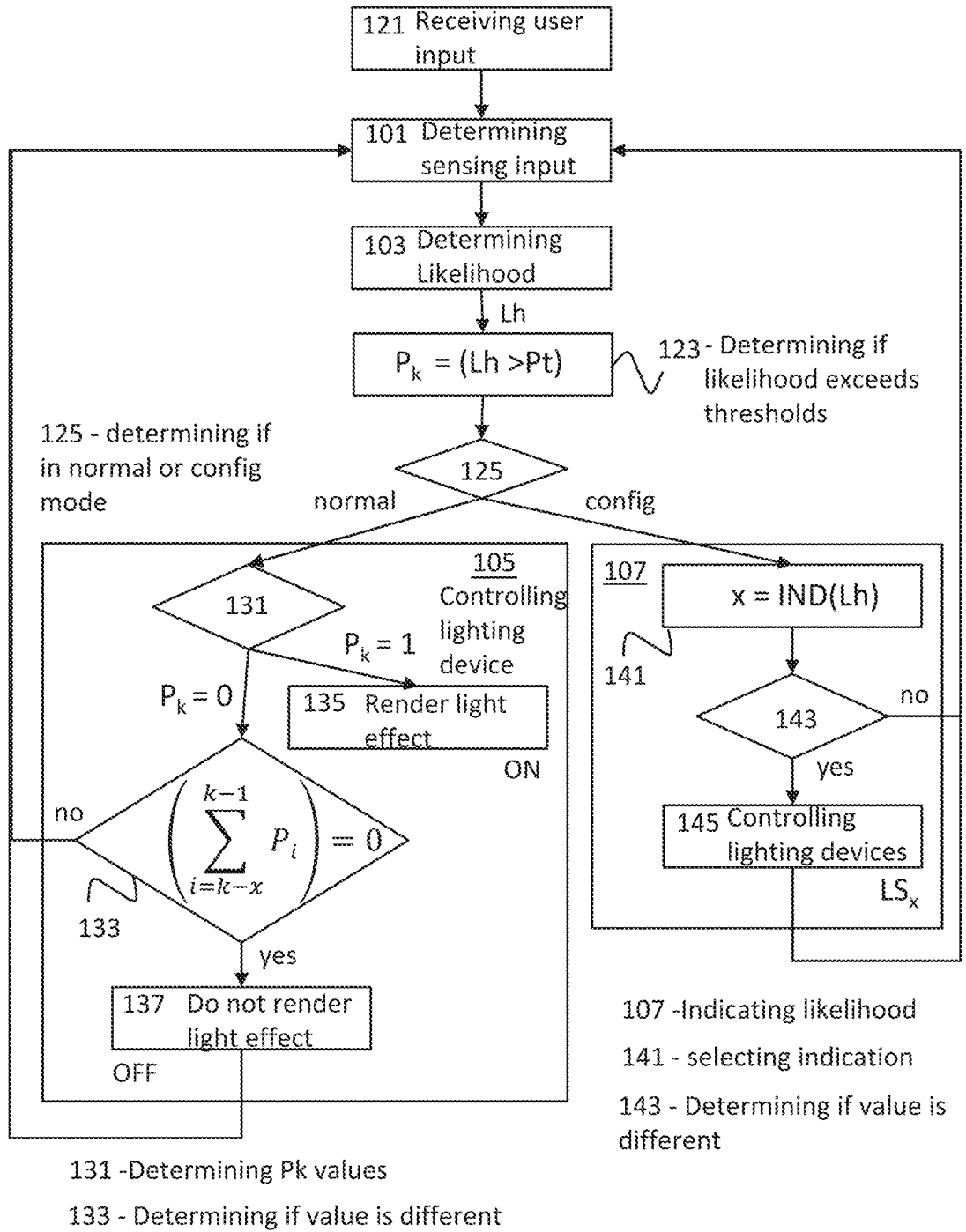
FIG. 6 is a flow diagram of a second embodiment of the method.

A second embodiment of determining a likelihood that a human or animal is present based on sensing input is shown in FIG. 6. In the embodiment of FIG. 6, step 101 of FIG. 3 is preceded by a step 121 and steps 123 and 125 are performed after step 103 of FIG. 3 and before steps 105 and 107 of FIG. 3. Furthermore, step 105 of FIG. 3 comprises sub steps 131-137 and step 107 of FIG. 3 comprises sub steps 141-145.

Step 121 comprises receiving user input and switching between a normal operations mode and a configuration mode based on the user input. Step 101 comprises determining the sensing input (e.g. from data received from the one or more sensing devices and/or by determining changes in signal strength or CSI in received RF sensing signals).

Step 103 comprises determining the likelihood Lh that the human or animal is present based on the sensing input. Step 123 comprises determining whether the likelihood Lh exceeds a presence detection threshold Pt. If so, a value 1 is assigned to presence indicator $P_k$ (k representing the current iteration/time). If not, a value 0 is assigned to presence indication $P_k$.

Step 125 comprises determining whether the normal operations mode or the configuration mode is active. Step 131 is performed if the normal operations mode is active. Step 131 comprises determining whether $P_k$, determined in step 123, has the value 0 or 1. If $P_k$ has the value 1, i.e. the likelihood Lh exceeds the presence detection threshold Pt, step 135 is performed next. Step 135 comprises ensuring that one or more lighting devices render a light effect, e.g. by transmitting control commands to lighting devices whose light source is turned off.

If $P_k$ has the value 0, i.e. the likelihood Lh does not exceed the presence detection threshold Pt, step 133 is performed next. In step 133, it is determined whether the last x values of the presence indication P before $P_k$, i.e. $P_{k-x}$ to $P_{k-1}$ also have the value 0. If they do, then step 137 is performed next. If they do not, then step 101 is repeated. Step 137 comprises ensuring that the one or more lighting devices do not render a light effect, e.g. by transmitting control commands to lighting devices whose light source is turned on. Step 101 is repeated after step 137.

Step 141 is performed if the configuration mode is active. Step 141 comprises selecting the indication x that corresponds to the likelihood Lh determined in step 103, e.g. by using a function called IND. For example, a likelihood range 0%-30% may be associated with a value 1, a likelihood range 31%-75% may be associated with a value 2 and a likelihood range 76%-100% may be associated with a value 3.

Step 143 comprises determining whether the value determined in step 141 is different than the value determined in the previous iteration of step 141. If the values are not different, then no different light effect needs to be rendered and step 101 is repeated. If the values are different, then step 145 is performed. Step 145 comprises controlling the one or more lighting devices to render the light effect corresponding to the value determined in step 141. A light setting $LS_1$ may be associated with a red light effect, a light setting $LS_2$ may be associated with a yellow light effect and a light setting $LS_3$ may be associated with a green light effect. Step 101 is repeated after step 145.

Although in FIG. 6, only step 101 is shown as being repeated after step 133, 137, 143 or 145 has been performed, step 121 may also be repeated to allow the user to switch modes. In the embodiment of FIG. 6, step 121 is performed before step 101. In an alternative embodiment, step 121 is performed after step 101 or concurrently with step 101.

In the embodiment of FIG. 6, one or more lighting devices have been associated with a room, which turn on when presence is detected (in normal operations mode), and the indication is only provided via these one or more lighting devices (in configuration mode). An example of this is shown in FIG. 4. A user 19 is standing in living room 51 in which lighting devices 31-34 have been installed. In the example of FIG. 4, the presence of user 19 has been detected with the help of the sensors of lighting devices 31-34 and lighting devices 31-34 render a green light effect to show that his presence has been detected.

In the example of FIG. 4, the lighting devices 35-36 in the kitchen 52 do not render any light effect. In the example of FIG. 5, the lighting devices 35-36 also render a light effect, which the user 19 may be able to see through an open door. The lighting devices 35-36 indicate whether presence has been detected with the help of the sensors of lighting devices 35-36. Since this is not the case, the lighting devices 35-36 render a red light effect.

Figure 7:
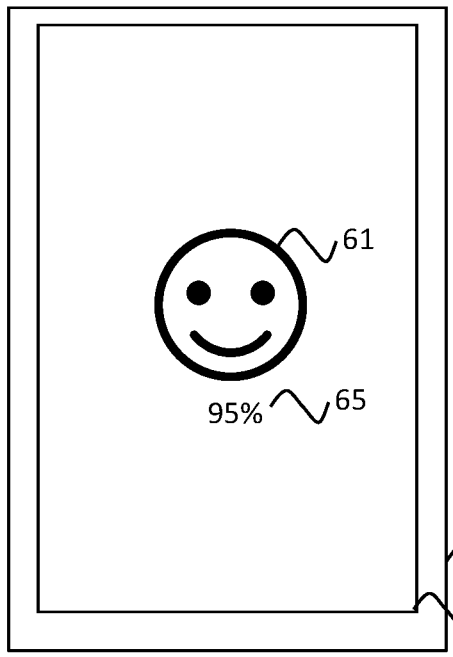
FIG. 7 shows a first example of a diagnostic user interface displayed at a first user position.

In the embodiment of FIG. 6, the likelihood indication is provided via one or more lighting devices. In an alternative embodiment, a likelihood indication is provided via another device, e.g. a mobile device. FIGS. 7 to 10 shows examples of diagnostic user interface for providing the indication via a display of a mobile device. FIG. 7 shows a first example of the diagnostic user interface. When the user is standing at a first user position, there is determined to be a likelihood of 95% that a human or animal is present. This likelihood is represented on the display 9 of mobile device 1 with a label 65.

In the examples of FIGS. 7-10, a likelihood range 0%-30% has been associated with a value 1, a likelihood range 31%-75% has been associated with a value 2 and a likelihood range 76%-100% has been associated with a value 3. These ranges may be user-configurable. A happy smiley 61 has been associated with value 3 and is therefore displayed on the display 9. This user interface allows the user to walk around the room/building, see whether his presence is detected at all (relevant) user positions, and diagnose problems in the current presence setup configuration.

Figure 8:
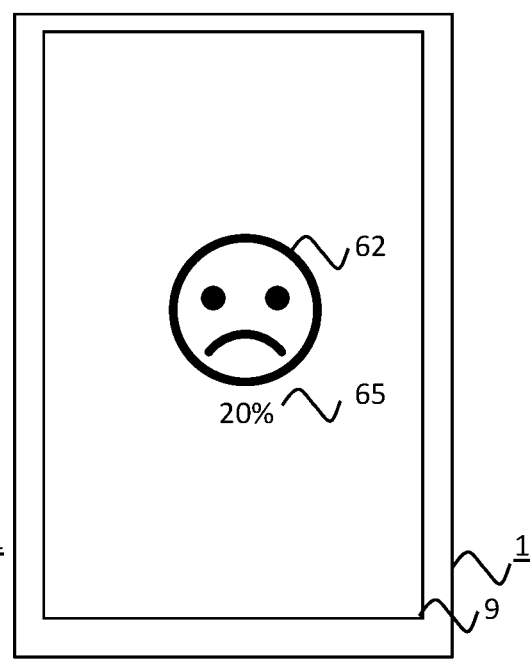
FIG. 8 shows the user interface of FIG. 7 displayed at a second user position.
Figure 9:
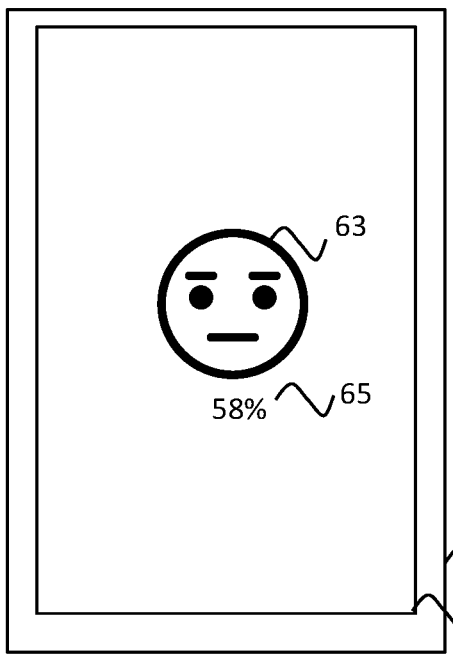
FIG. 9 shows the user interface of FIG. 7 displayed at a third user position.

In the example of FIG. 8, there is determined to be a likelihood of 20% that a human or animal is present when the user is standing at a second user position. This likelihood is again represented on the display 9 with the label 65. A sad smiley 62 has been associated with value 1 and is therefore displayed on the display 9. In the example of FIG. 9, there is determined to be a likelihood of 58% that a human or animal is present when the user is standing at a third user position. This likelihood is again represented on the display 9 with the label 65. A neutral smiley 63 has been associated with value 2 and is therefore displayed on the display 9.

In the above description of FIGS. 5 to 8, a person is described as walking around in order to configure the presence sensing. However, the person who is configuring the presence sensing is not necessarily the subject to be detected. It may be another person or an animal whose presence is detected. For example, a farmer may configure presence sensing in a barn for presence detection of his chickens or a pet owner may configure presence sensing in his home for presence detection of his pet(s).

Figure 10:
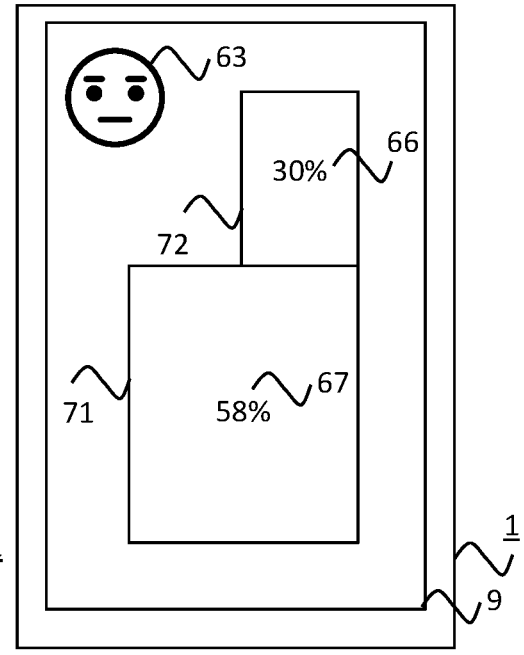
FIG. 10 shows a second example of a diagnostic user interface displayed at the third user position.

FIG. 10 shows a second example of a diagnostic user interface displayed when the user is standing at the third user position. The same sad smiley 63 is displayed in this second user interface as in the first user interface when the user is at the third position. However, in this second user interface, the rooms 71 and 72 are represented graphically on the display 9 and the likelihood that a user is present in rooms 71 and 72 is represented with labels 66 and 67, respectively.

The likelihood that a human or animal is present in living room 71 has been determined to be 58% and the likelihood that a human or animal is present in the kitchen 72 has been determined to be 30%. In the example of FIG. 10, the highest of the two likelihoods is used to determine which indication to provide (in this case, the neutral smiley 63). In an alternative embodiment, the neutral smiley 63 is shown inside the representation of room 71 and a sad smiley is shown inside the representation of room 72.

Figure 11:
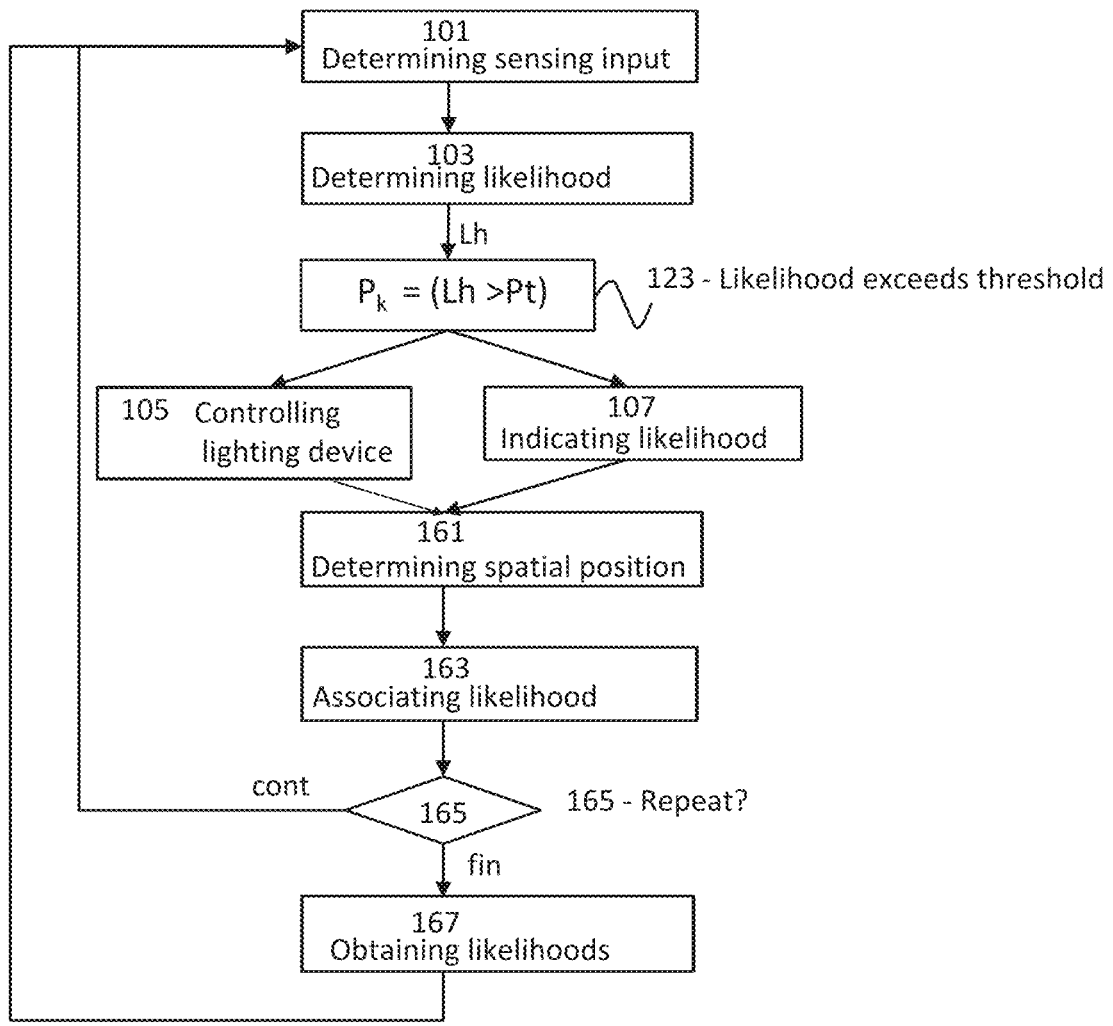
FIG. 11 is a flow diagram of a third embodiment of the method.

A third embodiment of determining a likelihood that a human or animal is present based on sensing input is shown in FIG. 11. In the embodiment of FIG. 11, step 123 of FIG.

6 has been included in the embodiment of FIG. 3 and steps 161-167 are performed after steps 105 and 107. Steps 105 and 107 may be implemented in the manner shown in FIG. 6 or may be implemented in a different manner, e.g. to provide the indication on a display of a mobile device.

Step 161 comprises determining the spatial position of the user at his current position ($SP_k$), e.g. using RF beacons. Step 163 comprises associating the likelihood $P_k$ determined in step 123 with this spatial position ($SP_k$) in a memory. This likelihood $P_k$ was determined based on RF signals transmitted and received while the user was at the determined position. This was done by comparing the signal strength or CSI of these RF signals with the signal strengths or CSIs of previously received RF signals.

In step 165, it is determined whether step 101 should be repeated or step 167 should be performed next. For example, the method may start when a user activates a configuration or diagnostic mode, starts a certain app, or presses a start button in an app and step 167 may be performed when the user deactivates the configuration or diagnostic mode or presses a stop button in the app. Step 167 is normally performed after a plurality of likelihoods that a human or animal is present has been determined (based on a plurality of sensing inputs). Thus, a plurality of likelihoods has been associated with respective spatial locations in the memory.

Step 167 comprises obtaining the plurality of likelihoods and the respective spatial locations from the memory, generating a spatial map indicating the plurality of likelihoods at the respective spatial locations and displaying the spatial map, e.g. on a display of a mobile device. Thus, this spatial map represents the detection coverage. Step 101 is repeated after step 167.

The spatial map be visualized, for example, using one of the following techniques:
(1) Using floorplan visualization. For example, the likelihood/confidence level of detection can be displayed as a floorplan with areas indicated using colors (e.g. green: high confidence of being detected, red: high confidence of not being detected).
(2) Using augmented reality (AR) capabilities of a mobile device (e.g. smartphone or AR glasses). For example, the user can view areas through a smart device (e.g. smartphone) to directly see areas with high and low likelihood/confidence of detection. Thus, the user could point the smart device toward the area to see detection likelihood/confidence level overlaid on top of the camera view.

Figure 12:
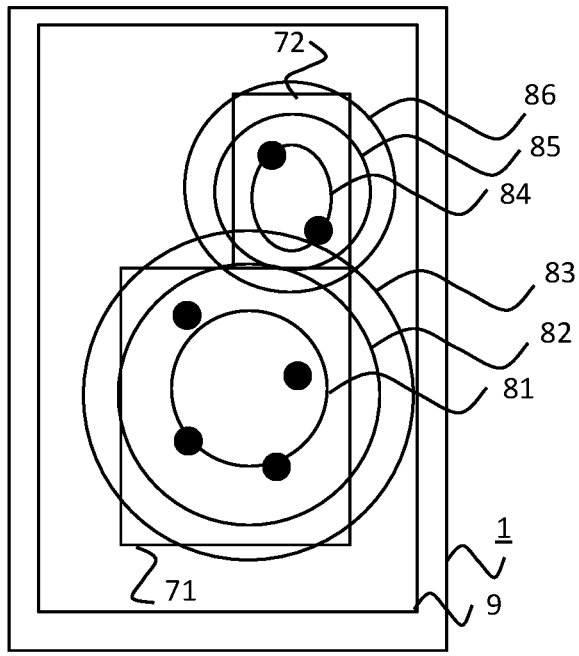
FIG. 12 shows a first example of a displayed spatial map representing detection coverage.

FIG. 12 shows an example of a spatial map visualized using floorplan visualization. Rooms 71 and 72 are graphically represented on display 9 of mobile device 1. Black disks indicate the positions of the lighting devices, which are also nodes of the presence sensor system and transmit or receive RF signals. A disk 81 and two rings 82 and 83 are superimposed over room 71. A disk 84 and two rings 85 and 86 are superimposed over room 72.

Disks 81 and 84 indicate a high likelihood of being detected and may be colored green, for example. Rings 82 and 85 indicate a medium likelihood of being detected and may be colored orange, for example. Rings 83 and 86 indicate a low likelihood of being detected and may be colored red, for example. The areas encompassed by the disks 81 and 84 and the rings 82 and 85 are the detection areas.

Figure 13:
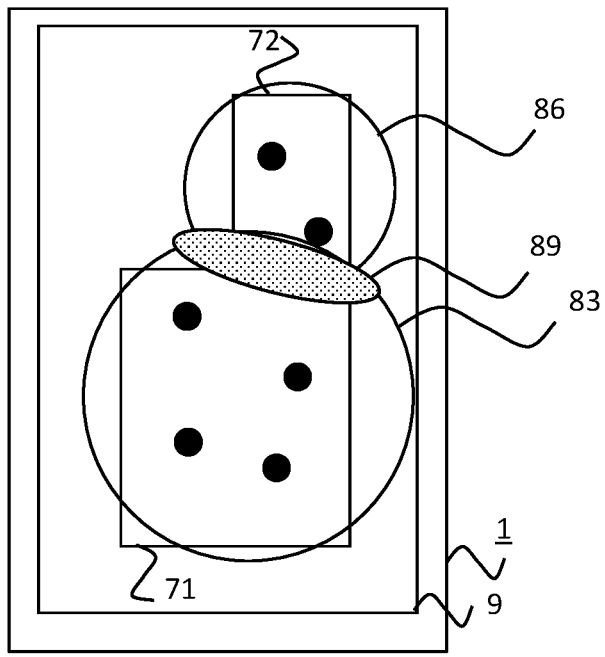
FIG. 13 shows a second example of a displayed spatial map representing detection coverage.

FIG. 13 shows a second example of a displayed spatial map representing detection coverage. In this second example, the areas where it is expected to have conflicting detection results between two detection areas are shown. The area 89 shows that the overlapping area between rooms 71 and 72 is most likely to cause issues, meaning that likelihood/confidence level of detecting a user is similar for both detection areas in that particular spot.

This visualization could help solve issues in multi-area situations, e.g. when it is not possible to determine in which area a user is present. Changing the positions of the RF transmitter(s) and/or receiver(s), changing transmit power(s) and/or changing detection parameters like area sensitivity might help solve these issues. In the example of FIG. 13, rings 83 and 86 are shown to make the visualization easier to understand. In an alternative visualization, rings 83 and 86 are omitted and/or one or more of disks 81 and 84 and rings 82 and 85 are shown.

Figure 14:
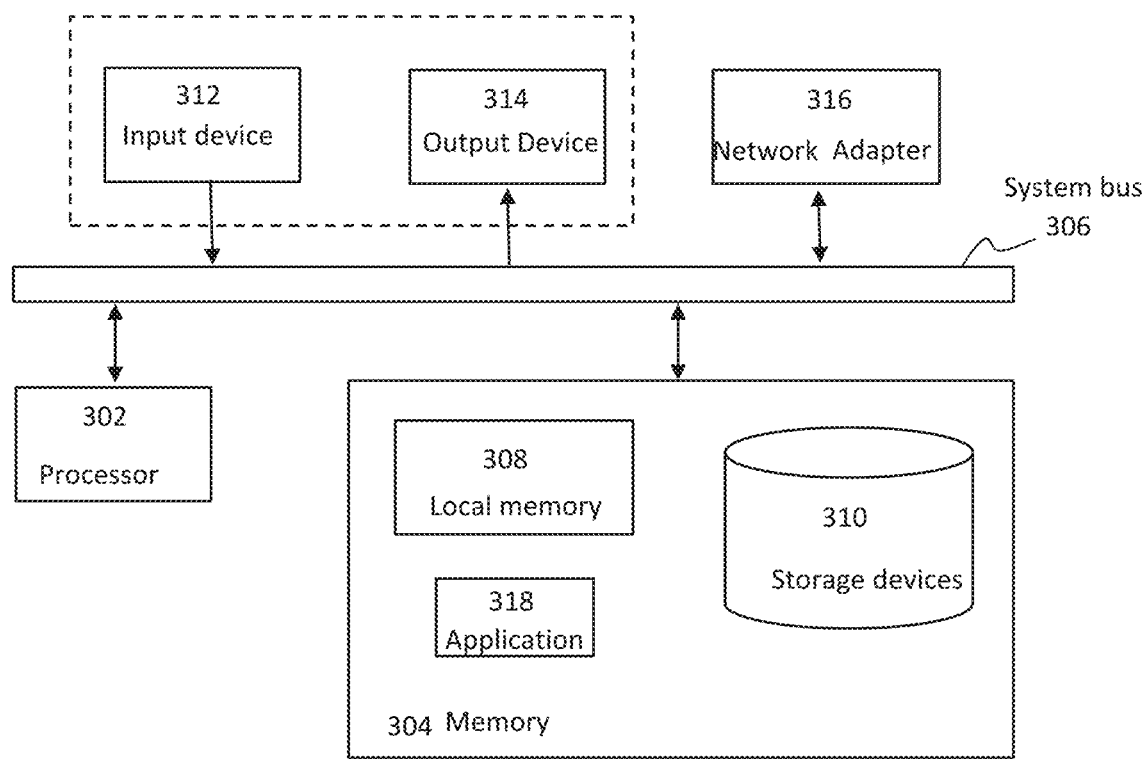
FIG. 14 is a block diagram of an exemplary data processing system for performing the method of the invention.

FIG. 14 depicts a block diagram illustrating an exemplary data processing system that may perform the method as described with reference to FIGS. 3, 6, and 11.

As shown in FIG. 14, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 14 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 14, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 14) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 14 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining a likelihood that a human or animal is present based on sensing input, said sensing input reflecting changes in radio frequency signals received by one or more devices, comprising:
   at least one input interface;
   at least one output interface; and
   at least one processor configured to:
      use said at least one input interface to determine said sensing input,
      determine said likelihood that said human or animal is present based on said sensing input,
      use said at least one output interface to control a lighting device, in a normal operations mode of the lighting device, to render a light effect upon determining that said determined likelihood exceeds a presence detection threshold, and to continue to render said light effect for a subsequent predetermined period of time even when said determined likelihood changes by more than a predetermined value within said predetermined period, and
      use said at least one output interface to indicate, in a configuration mode of the lighting device, said determined likelihood to a user via said lighting device by rendering a further light effect of a plurality of light effects, the further light effect being selected based on the determined likelihood,
   wherein the processor being configured to determine a value of a plurality of values corresponding to the determined likelihood, with each value of the plurality of values being associated with a respective likelihood range and with a corresponding further lighting effect, wherein said processor being configured to select subsequent further light effect of the plurality of light effects, different from a previously selected further lighting effect, upon determining that a subsequently determined likelihood corresponding to a different value as compared to a previously determined value.

2. The system as claimed in claim 1, wherein said at least one processor is configured to use said at least one input interface to receive user input and switch between said normal operations mode and said configuration mode based on said user input.

3. The system as claimed in claim 1, wherein said at least one processor is configured to determine a chromaticity, brightness and/or light output level for said further light effect based on said likelihood such that said chromaticity, brightness and/or light output level indicates said likelihood.

4. The system as claimed in claim 1, wherein said at least one processor is configured to determine said further light effect based on said likelihood and said lighting device's capabilities.

5. The system as claimed in claim 1, wherein in the configuration mode of the lighting device, said at least one processor is configured to select a first light effect from said plurality of light effects upon determining that said likelihood exceeds said presence detection threshold and a second light effect from said plurality of light effects upon determining that said likelihood is below said presence detection threshold.

6. The system as claimed in claim 5, wherein in the configuration mode of the lighting device, said at least one processor is configured to determine a color for said further light effect in a first color spectrum upon determining that said likelihood exceeds said presence detection threshold and a color for said further light effect in a second color spectrum upon determining that said likelihood is below said presence detection threshold.

7. The system as claimed in claim 6, wherein in the configuration mode of the lighting device, said at least one processor is configured to determine said color within said first color spectrum or said second color spectrum based on said first likelihood such that said color further indicates said likelihood.

8. The system as claimed in claim 1, wherein said at least one processor is configured to determine a level of dynamicity for said further light effect based on said likelihood such that said level of dynamicity indicates said likelihood.

9. The system as claimed in claim 1, wherein said at least one processor is configured to determine a plurality of likelihoods that a human or animal is present based on a plurality of sensing inputs, each of said plurality of sensing inputs corresponding to a respective spatial location of said human or animal, and associate each of said plurality of likelihoods with said respective spatial locations in a memory.

10. The system as claimed in claim 9, wherein when the system further comprises a display, said at least one processor is configured to use the display to display a spatial map indicating said plurality of likelihoods at said respective spatial locations.

11. The system as claimed in claim 1, wherein said lighting device is one of said one or more devices.

12. A system for determining a likelihood that a human or animal is present based on sensing input, said sensing input reflecting changes in radio frequency signals received by one or more devices, comprising:
at least one input interface;
at least one output interface; and
at least one processor configured to:
use said at least one input interface to determine said sensing input,
determine said likelihood that said human or animal is present based on said sensing input,
use said at least one output interface to control a lighting device, in a normal operations mode of the lighting device, to render a light effect upon determining that said determined likelihood exceeds a presence detection threshold, and to continue to render said light effect for a subsequent predetermined period of time even when said likelihood changes by more than a predetermined value within said predetermined period, and
indicate said determined likelihood to a user via an indication selected from a plurality of indications, by using said at least one output interface to send the indication to a remote display to indicate said likelihood to said user by displaying said indication on the remote display, or when the system further comprises a display by using the display to indicate the likelihood to the user by displaying the indication on the display;
wherein the at least one processor being configured to determine the indication of the plurality of indications corresponding to the determined likelihood, with each indication of the plurality of indications being associated with a respective likelihood or likelihood range,
wherein the indication is represented on the remote display or the display numerically, graphically, or in combination of both.

13. A method of determining a likelihood that a human or animal is present based on sensing input, said sensing input reflecting changes in radio frequency signals received by one or more devices, comprising:
determining said sensing input;
determining said likelihood that said human or animal is present based on said sensing input;
controlling a lighting device to render a light effect, in a normal operations mode of said lighting device, upon determining that said determined likelihood exceeds a presence detection threshold, and to continue to render said light effect for a subsequent predetermined period of time even when said determined likelihood changes by more than a predetermined value within said predetermined period;
indicating, in a configuration mode of the lighting device, said determined likelihood to a user via said lighting device by rendering a further light effect of a plurality of light effects;
selecting the further light effect based on the determined likelihood;
determining a value of a plurality of values corresponding to the determined likelihood, with each value of said plurality of values being associated with a respective likelihood range and with a corresponding further lighting effect; and
selecting a subsequent further light effect, of the plurality of light effects, different from a previously selected further lighting effect, upon determining that a subsequently determined likelihood corresponding to a different value as compared to a previously determined value.

14. A non-transitory computer readable medium comprising instructions, the instructions, when executed by a computer system, cause the computer system to perform the method of claim 13.

* * * * *